United States Patent
Noda et al.

(10) Patent No.: US 9,279,958 B2
(45) Date of Patent: Mar. 8, 2016

(54) IMAGING LENS AND IMAGING APPARATUS EQUIPPED WITH THE IMAGING LENS

(71) Applicant: FUJIFILM Corporation, Tokyo (JP)

(72) Inventors: Takayuki Noda, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/300,766

(22) Filed: Jun. 10, 2014

(65) Prior Publication Data

US 2014/0368931 A1 Dec. 18, 2014

(30) Foreign Application Priority Data

Jun. 12, 2013 (JP) .................................. 2013-123648

(51) Int. Cl.
*G02B 13/18* (2006.01)
*G02B 3/02* (2006.01)
*G02B 9/62* (2006.01)
*G02B 13/00* (2006.01)

(52) U.S. Cl.
CPC .............. *G02B 13/0045* (2013.01); *G02B 9/62* (2013.01)

(58) Field of Classification Search
CPC ........................................................ G02B 9/62
USPC .................................................. 359/713, 761
See application file for complete search history.

(56) References Cited

U.S. PATENT DOCUMENTS

| 8,335,043 | B2 | 12/2012 | Huang | |
|---|---|---|---|---|
| 2014/0118844 | A1* | 5/2014 | Tsai et al. | 359/713 |
| 2014/0376107 | A1* | 12/2014 | Son | 359/713 |

FOREIGN PATENT DOCUMENTS

| JP | 2004-294910 | 10/2004 |
|---|---|---|
| JP | 2005-258294 | 9/2005 |

* cited by examiner

*Primary Examiner* — William Choi
(74) *Attorney, Agent, or Firm* — Young & Thompson

(57) ABSTRACT

An imaging lens substantially includes six lenses, constituted by: a first lens having a negative refractive power; a second lens having a positive refractive power; a third lens having a positive refractive power; a fourth lens having a negative refractive power; a fifth lens having a positive refractive power; and a sixth lens having a negative refractive power, a concave surface toward an image side, and at least one inflection point in the surface toward the image side; provided in this order from an object side. The imaging lens satisfies a predetermined conditional formula.

19 Claims, 8 Drawing Sheets

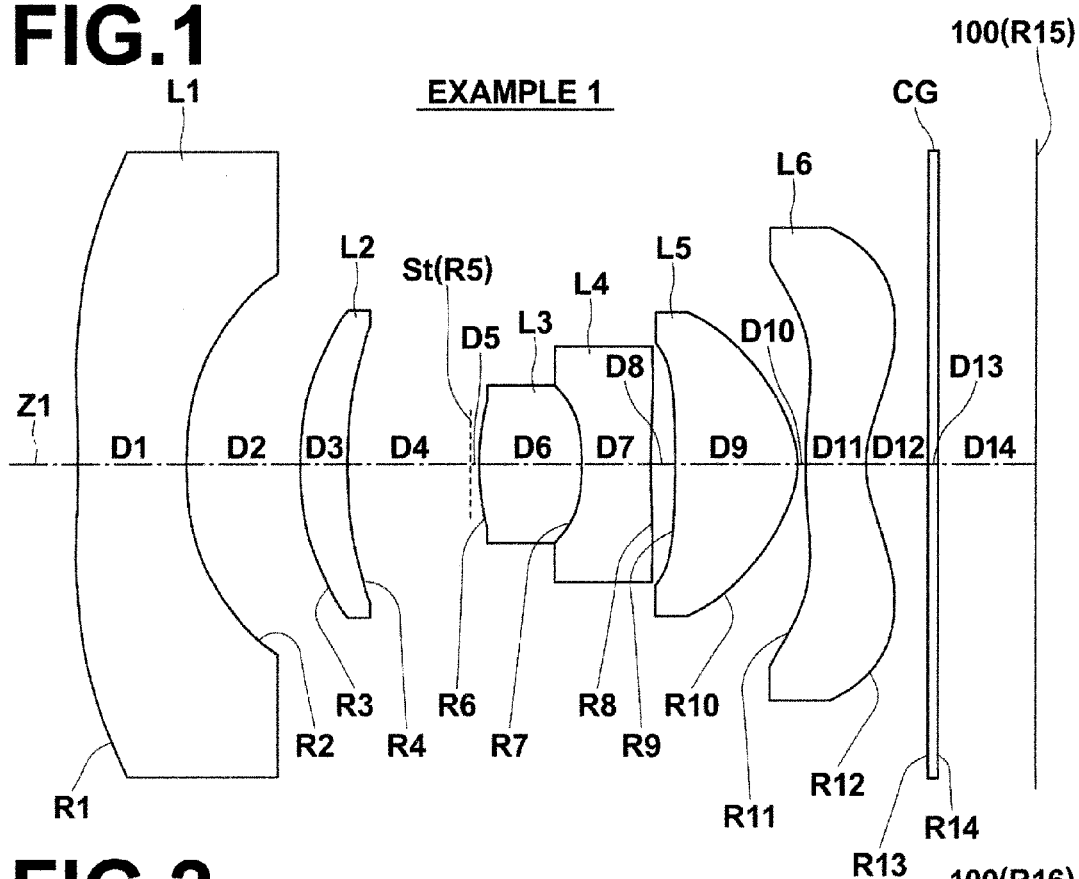
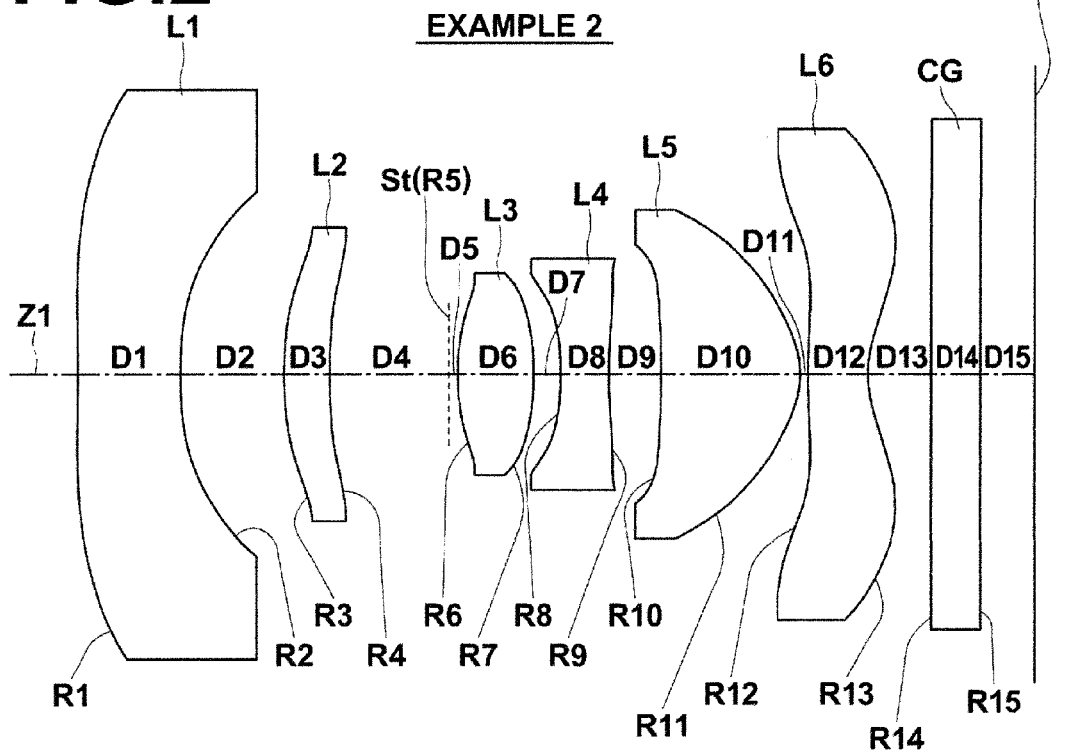

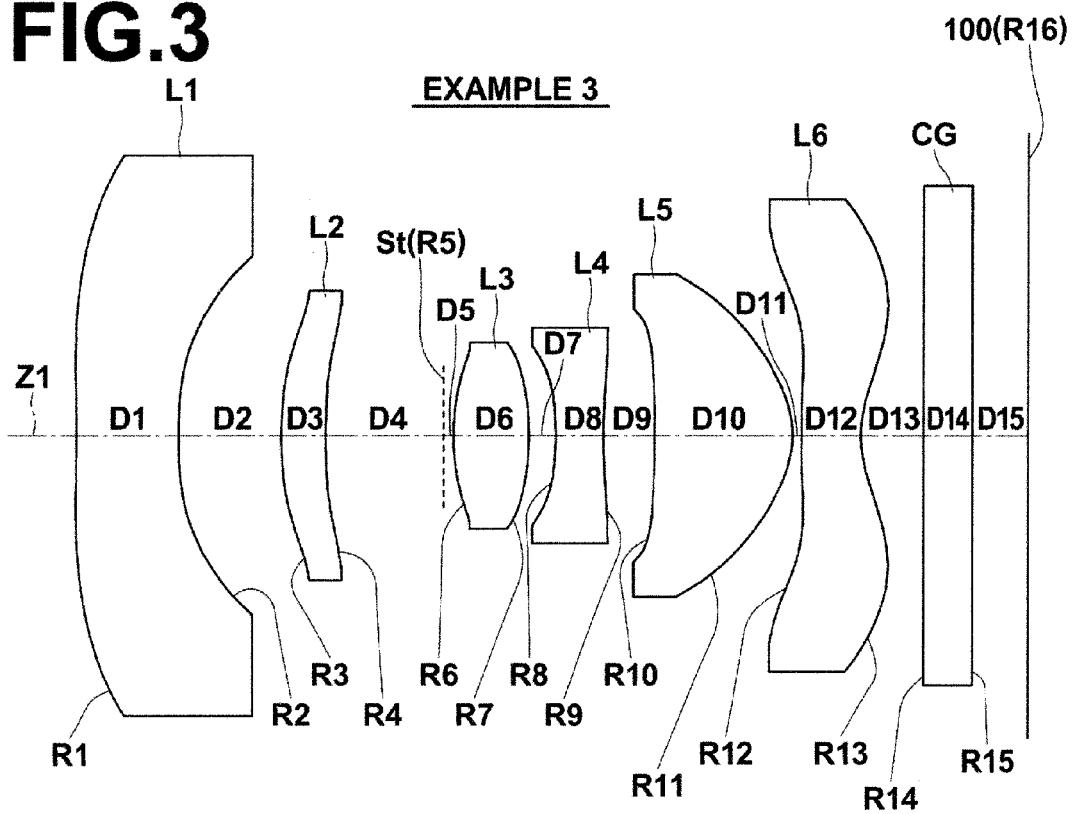
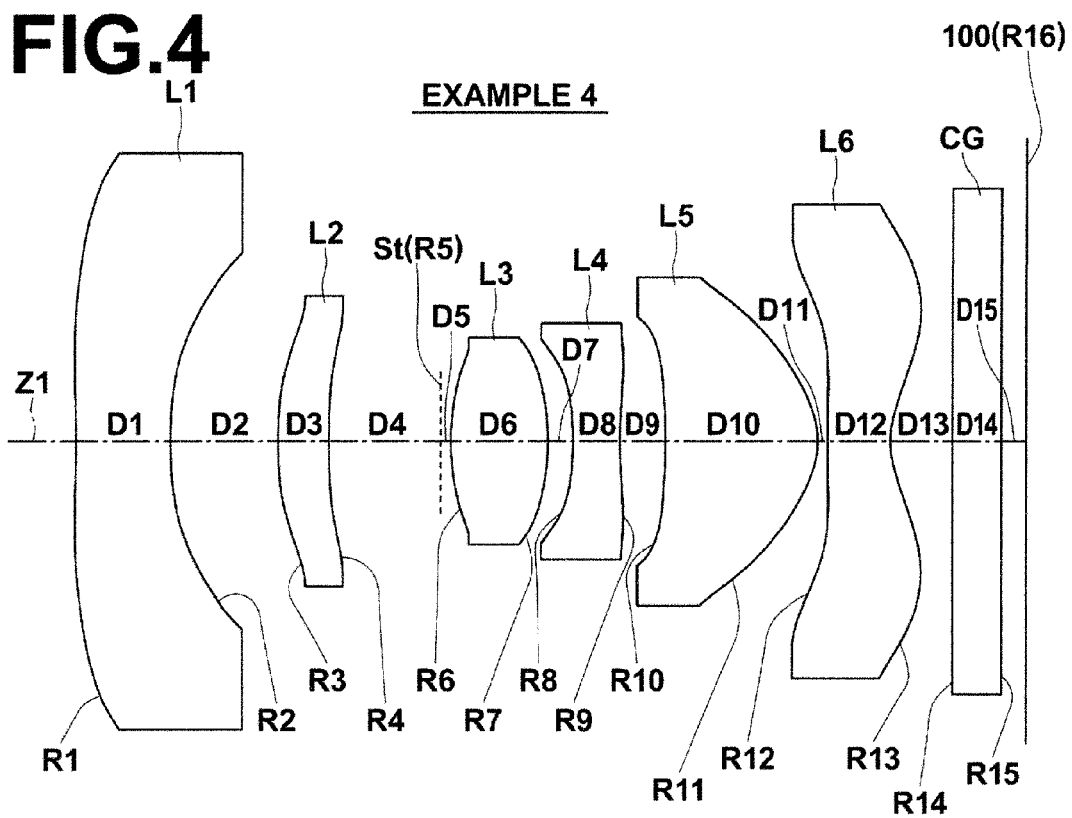

EXAMPLE 1

EXAMPLE 3

EXAMPLE 4

IMAGING LENS AND IMAGING APPARATUS EQUIPPED WITH THE IMAGING LENS

CROSS REFERENCE TO RELATED APPLICATIONS

The present application claims priority under 35 U.S.C §119 to Japanese Patent Application No. 2013-123648, filed on Jun. 12, 2013. The above application is hereby expressly incorporated by reference, in its entirety, into the present application.

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones and smart phones are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, imaging lenses having a five lens configuration, which is a comparatively large number of lenses, have been proposed. Further, imaging lenses having a six lens configuration, which is an even greater number of lenses, have been proposed to further improve performance. For example, U.S. Pat. No. 8,335,043, Japanese Unexamined Patent Publication No. 2004-294910, and Japanese Unexamined Patent Publication No. 2005-258294 disclose imaging lenses having six lens configurations, including a first lens having a negative refractive power, a second lens having a positive refractive power, a third lens having a positive refractive power, a fourth lens, a fifth lens, and a sixth lens having a negative refractive power, provided in this order from an object side.

DISCLOSURE OF THE INVENTION

Meanwhile, there is demand to obtain images that include desired image portions, which are photographed at high resolution with as wide an angle of view as possible, and to employ the desired image portions within the photographed images by enlarging the desired image portions, in imaging lenses which are employed, particularly in devices such as smart phones and tablet terminals. An imaging lens having a wide angle of view that can favorably correct distortion is desired in order to meet this demand. However, the imaging lens disclosed in U.S. Pat. No. 8,335,043 does not correct distortion sufficiently. In addition, realizing a further widening of the angle of view is desired for the imaging lenses disclosed in Japanese Unexamined Patent Publication Nos. 2004-294910 and 2005-258294.

The present invention has been developed in view of the foregoing points. The object of the present invention is to provide an imaging lens that can realize high imaging performance from a central angle of view through peripheral angles of view while realizing a wide angle of view and favorable correction of distortion. It is another object of the present invention to provide an imaging apparatus equipped with the lens, which is capable of obtaining high resolution photographed images.

A first imaging lens of the present invention substantially consists of six lenses, including:
a first lens having a negative refractive power;
a second lens having a positive refractive power;
a third lens having a positive refractive;
a fourth lens having a negative refractive power;
a fifth lens having a positive refractive power; and
a sixth lens having a negative refractive power, a concave surface toward an image side, and at least one inflection point on the surface toward the image side; provided in this order from an object side;
the imaging lens satisfying the following conditional formula:

$$1 < f \cdot \tan \omega / R6r < 20 \tag{1}$$

wherein f is the focal length of the entire system, ω is the half angle of view, and R6r is the paraxial radius of curvature of the surface of the sixth lens toward the image side.

A second imaging lens of the present invention substantially consists of six lenses, including:
a first lens having a negative refractive power;
a second lens having a positive refractive power;
a third lens having a positive refractive;
a fourth lens having a negative refractive power;
a fifth lens having a positive refractive power; and
a sixth lens having a negative refractive power, a concave surface toward an image side, and at least one inflection point on the surface toward the image side; provided in this order from an object side;
the imaging lens satisfying the following conditional formula:

$$-0.3 < f/f12 < 0 \tag{2}$$

wherein f is the focal length of the entire system, and f12 is the combined focal length of the first lens and the second lens.

A third imaging lens of the present invention substantially consists of six lenses, including:
a first lens having a negative refractive power and a concave surface toward an object side;
a second lens having a positive refractive power;
a third lens having a positive refractive;
a fourth lens having a negative refractive power;
a fifth lens having a positive refractive power; and
a sixth lens having a negative refractive power, a concave surface toward an image side, and at least one inflection point on the surface toward the image side; provided in this order from the object side.

In the first through third imaging lenses of the present invention, the configurations of each of the first lens through the sixth lens are optimized as lens elements in a lens configuration having a total of six lenses. Therefore, a lens system having high resolution performance can be realized, while the total length can be shortened.

Note that in the first through third imaging lenses of the present invention, the expression "substantially consists of six lenses" means that the imaging lens of the present invention may also include lenses that practically have no power, optical elements other than lenses such as aperture stops and a cover glass, and mechanical components such as lens flanges, a lens barrel, an imaging element, a blur correcting mechanism, etc., in addition to the six lenses. In addition, the shapes of the surfaces of the lenses and the signs of the refractive indices thereof are considered in the paraxial region in the case that the lenses include aspherical surfaces.

The optical performance of the first through third imaging lenses of the present invention can be further improved by adopting the following favorable configurations.

In the first through third imaging lenses of the present invention, it is preferable for a surface which has a radius of curvature with the smallest absolute value from among the lens surfaces of the first lens through the sixth lens to be the surface of the fifth lens toward the image side, in the case that the surface of the fifth lens toward the image side is a convex surface.

In addition, it is preferable for the first through third imaging lenses of the present invention to further be equipped with an aperture stop provided between the second lens and the third lens.

It is preferable for the first imaging lens of the present invention to satisfy one of Conditional Formulae (1-1) through (8) below. Note that a preferred aspect of the first imaging lens of the present invention may satisfy any one of Conditional Formulae (1-1) through (8), or may satisfy arbitrary combinations of Conditional Formulae (1-1) through (8).

In addition, it is preferable for the second imaging lens of the present invention to satisfy one of Conditional Formulae (1) through (1-2) and Conditional Formulae (2-1) through (8) below. Note that a preferred aspect of the second imaging lens of the present invention may satisfy any one of Conditional Formulae (1) through (1-2) and Conditional Formulae (2-1) through (8), or may satisfy arbitrary combinations of Conditional Formulae (1) through (1-2) and Conditional Formulae (2-1) through (8). Note that a preferred aspect of the third imaging lens of the present invention may satisfy any one of Conditional Formulae (1) through (8), or may satisfy arbitrary combinations of Conditional Formulae (1) through (8).

$$1 < f \cdot \tan \omega / R6r < 20 \tag{1}$$

$$1.5 < f \cdot \tan \omega / R6r < 10 \tag{1-1}$$

$$1.5 < f \cdot \tan \omega / R6r < 5 \tag{1-2}$$

$$-0.3 < f/f12 < 0 \tag{2}$$

$$-0.25 < f/f12 < -0.05 \tag{2-1}$$

$$-5 < f/f6 < -0.7 \tag{3}$$

$$-4 < f/f6 < -0.9 \tag{3-1}$$

$$Da/f < 1 \tag{4}$$

$$0.3 < Db/f < 1 \tag{5}$$

$$Dc/f < 0.15 \tag{6}$$

$$Dc/f < 0.1 \tag{6-1}$$

$$1.2 < f/f5 < 5 \tag{7}$$

$$-0.55 < f/f1 < -0.1 \tag{8}$$

wherein f is the focal length of the entire system, $\omega$ is a half angle of view, R6r is the paraxial radius of curvature of the surface of the sixth lens toward the image side, f1 is the focal length of the first lens, f5 is the focal length of the fifth lens, f6 is the focal length of the sixth lens, f12 is the combined focal length of the first lens and the second lens, Da is the distance between the second lens and the third lens along an optical axis, Db is the distance between the first lens and the second lens along the optical axis, and Dc is the distance between the fifth lens and the sixth lens along the optical axis.

An imaging apparatus of the present invention is equipped with one of the first, the second, and the third imaging lens of the present invention.

In the first through third imaging lenses of the present invention, the configuration of each lens element in a six lens configuration is optimized. Therefore, lens systems having wide angles of view, which are capable of favorably correcting distortion, and further having high imaging performance from a central angle of view through peripheral angles of view, can be realized.

In the first imaging lens of the present invention, the configuration of each lens element in a six lens configuration is optimized, and Conditional Formula (1) is satisfied. Therefore, shortening of the total length is realized, field curvature can be favorably corrected, and increases in the incident angles of light rays that pass through the optical system and enter an imaging surface (imaging device), particularly at peripheral angles of view, can be suppressed.

In the second imaging lens of the present invention, the configuration of each lens element in a six lens configuration is optimized, and Conditional Formula (2) is satisfied. Therefore, distortion can be corrected more favorably, and increases in the angle between light rays that pass through the first lens and the second lens and the optical axis can be suppressed, which is advantageous from the viewpoint of realizing a wide angle of view.

In the third imaging lens of the present invention, the configuration of each lens element in a six lens configuration is optimized, and particularly, the first lens is configured to have a concave surface toward the object side. Therefore, increases in the angle between light rays that pass through the first lens and the optical axis can be suppressed, which is advantageous from the viewpoint of realizing a wide angle of view.

In addition, the imaging apparatus of the present invention outputs image signals corresponding to optical images formed by the first through third imaging lenses of the present invention, which have high imaging performance. Therefore, high resolution images can be obtained.

BRIEF DESCRIPTION OF THE DRAWINGS

FIG. 1 is a sectional diagram that illustrates a first example of the configuration of an imaging lens according to an embodiment of the present invention, and corresponds to a lens of Example 1.

FIG. 2 is a sectional diagram that illustrates a second example of the configuration of an imaging lens according to an embodiment of the present invention, and corresponds to a lens of Example 2.

FIG. 3 is a sectional diagram that illustrates a third example of the configuration of an imaging lens according to an embodiment of the present invention, and corresponds to a lens of Example 3.

FIG. 4 is a sectional diagram that illustrates a fourth example of the configuration of an imaging lens according to an embodiment of the present invention, and corresponds to a lens of Example 4.

BEST MODE FOR CARRYING OUT THE INVENTION

Hereinafter, embodiments of the present invention will be described in detail with reference to the attached drawings.

Figure 5:
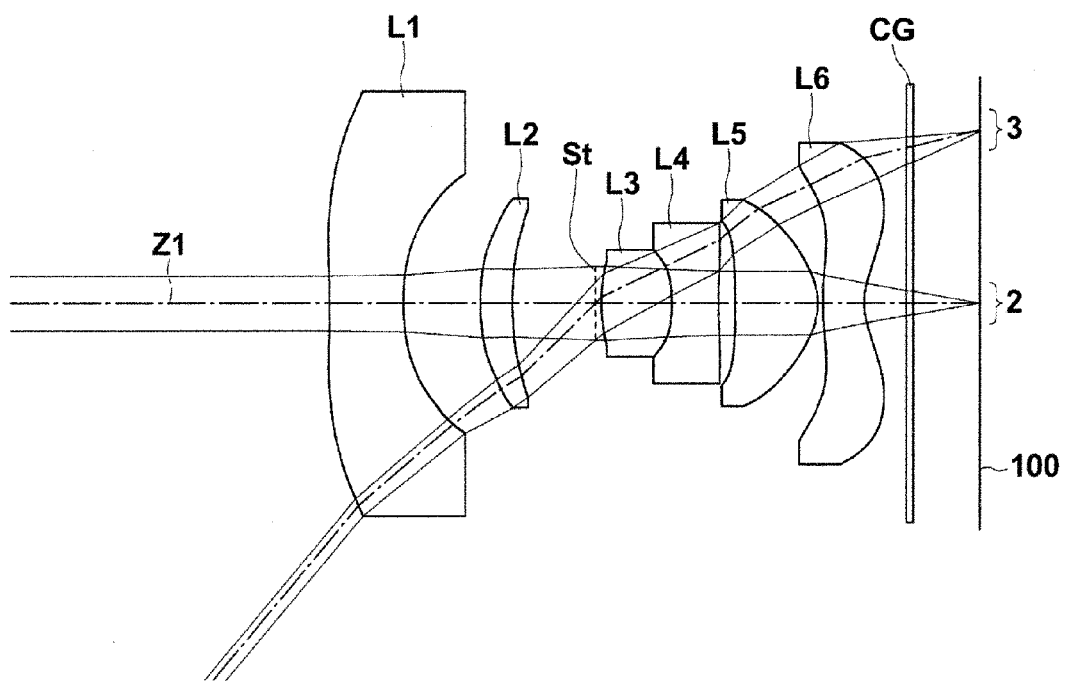
FIG. 5 is a diagram that illustrates the paths of light rays that pass through the imaging lens of FIG. 1.

FIG. 1 illustrates a first example of the configuration of an imaging lens according to an embodiment of the present invention. This example corresponds to the lens configuration of Numerical Example 1 (Table 1 and Table 2), to be described later. Similarly, FIG. 2 through FIG. 4 are sectional diagrams that illustrate second through fourth examples of lens configurations that correspond to Numerical Examples 2 through 4 (Table 3 through Table 8). In FIGS. 1 through 4, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 4 will also be described as necessary. In addition, FIG. 5 is a diagram that illustrates the paths of light rays that pass through the imaging lens L of FIG. 1. FIG. 5 illustrates the paths of an axial light beam 2 and a maximum angle of view light beam 3 from an object at a distance of infinity.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, and a PDA. The imaging lens L is equipped with a first lens L1, a second lens L2, a third lens L3, a fourth lens L4, a fifth lens L5, and a sixth lens L6 along the optical axis Z1, in this order from the object side.

Figure 10:
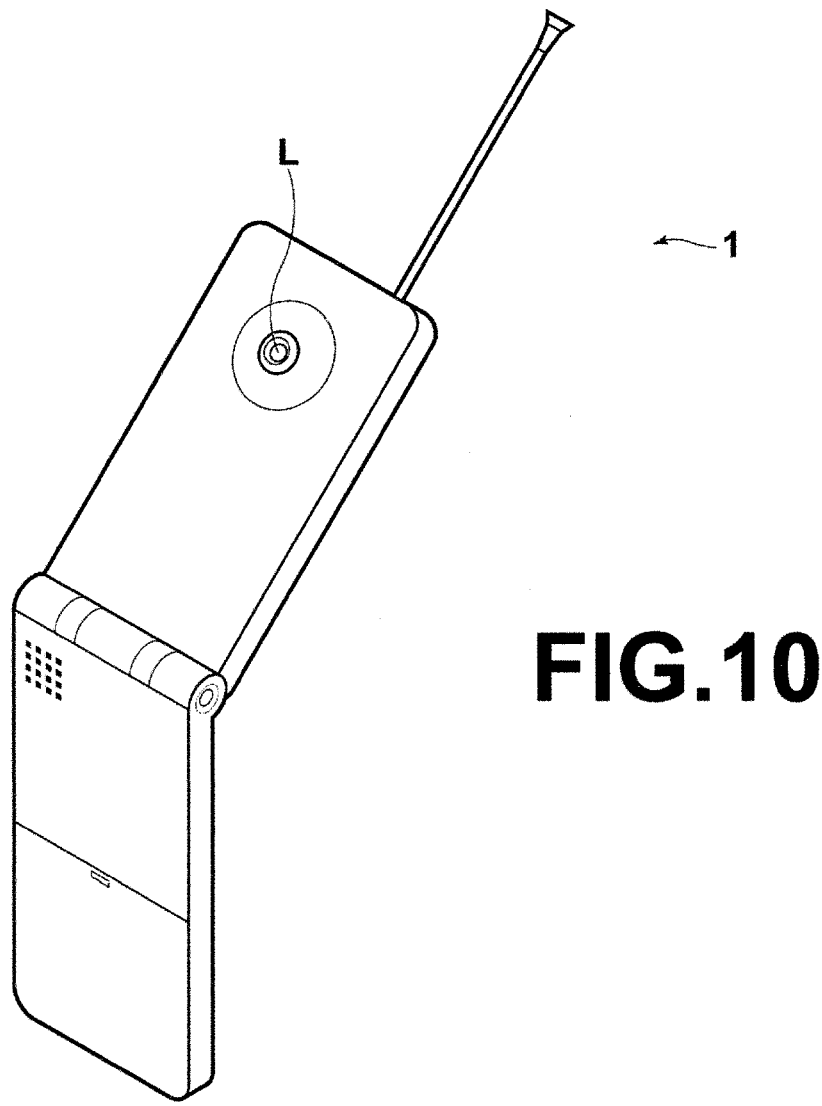
FIG. 10 is a diagram that illustrates a cellular telephone as an imaging apparatus equipped with the imaging lens of the present invention.

FIG. 10 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface R15 in FIG. 1, image surfaces R16 in FIGS. 2 through 4) of the imaging lens L.

Figure 11:
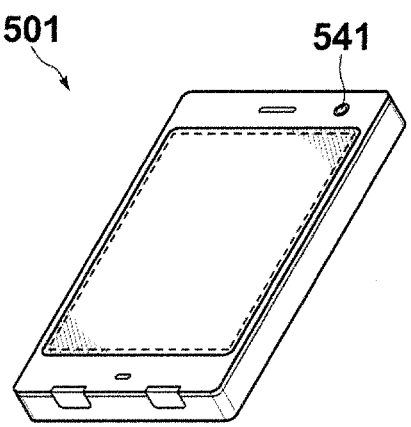
FIG. 11 is a diagram that illustrates a smart phone as an imaging apparatus equipped with the imaging lens of the present invention.

FIG. 11 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface) of the imaging lens L.

Various optical members CG may be provided between the sixth lens L6 and the imaging element 100, depending on the configuration of the camera to which the lens is applied. A planar optical member such as a cover glass for protecting the imaging surface and an infrared cutoff filter may be provided, for example. In this case, a planar cover glass having a coating having a filtering effect such as an infrared cutoff filter coating or an ND filter coating, or a material that exhibits similar effects, may be utilized as the optical member CG.

Alternatively, the optical member CG may be omitted, and a coating may be administered on the sixth lens L6 to obtain the same effect as that of the optical member CG. In this case, the number of parts can be reduced, and the total length can be shortened.

It is preferable for the imaging lens L to be equipped with an aperture stop St provided between the second lens L2 and the third lens L3. By providing the aperture stop St between the second lens L2 and the third lens L3, an increase in the effective diameter of the first lens, which is likely to occur when realizing a wide angle of view, can be suppressed. In the present embodiment, Examples 1 through 4 (FIGS. 1 through 4) are configurations in which the aperture stop St is provided between the second lens L2 and the third lens L3. Note that the aperture stops St illustrated in FIGS. 1 through 4 do not necessarily represent the sizes or shapes thereof, but indicate the positions thereof on the optical axis Z1.

In the imaging lens L, the first lens L1 has a negative refractive power in the vicinity of the optical axis. Thereby, increases in the angles between light rays that have passed through the first lens L1 and the optical axis can be suppressed, which is advantageous from the viewpoint of realizing a wide angle of view. In addition, it is preferable for the first lens L1 to have a negative refractive power in the vicinity of the optical axis and a concave surface toward the object side. In this case, the incident angles of principal rays of light that have passed through the first lens L1 and enter the second lens L2 can be decreased, which is advantageous from the viewpoint of realizing a wide angle of view. In addition, by the first lens L1 having a negative refractive power in the vicinity of the optical axis and a concave surface toward the object side, the rearward principal point of the first lens L1 can be closer to the object side. Therefore, a favorable amount of back focus can be secured. In addition, it is preferable for the first lens L1, which is the lens most toward the object side, to be of a biconcave shape in the vicinity of the optical axis, as illustrated in each of the examples. In this case, a shortening of the total length can be realized, while securing a favorable amount of back focus.

The second lens L2 has a positive refractive power in the vicinity of the optical axis. Thereby, distortion and lateral chromatic aberration can be favorably corrected. In addition, in the case that the second lens L2 is of a meniscus shape having a convex surface toward the object side in the vicinity of the optical axis, as illustrated in each of the examples, the generation of astigmatism can be suppressed, and is advantageous from the viewpoint of realizing a wide angle of view.

The third lens L3 has a positive refractive power in the vicinity of the optical axis. In this case, spherical aberration can be favorably corrected. In addition, it is preferable for the third lens L3 to be of a biconvex shape in the vicinity of the optical axis, as illustrated in each of the examples, in order to further increase this advantageous effect.

The fourth lens L4 has a negative refractive power in the vicinity of the optical axis. Spherical aberration and longitudinal chromatic aberration can be favorably corrected, by providing the fourth lens L4 having a negative refractive power toward the image side of the third lens L3 having a positive refractive power. In addition, it is preferable for the fourth lens L4 to be of a biconcave shape in the vicinity of the optical axis, as illustrated in each of the examples, in order to further increase this advantageous effect.

In addition, as illustrated in Example 1, the third lens L3 and the fourth lens L4 may be cemented together in the imaging lens L. In this case, the generation of high order spherical aberration can be suppressed to a greater degree than in a case that the third lens L3 and the fourth lens L4 are not cemented together. Further, both the absolute value of the radius of curvature of the surface of the third lens L3 toward the image side and the absolute value of the radius of curvature of the surface of the fourth lens L4 toward the object side can be set small, and longitudinal chromatic aberration can be favorably corrected. Meanwhile, the third lens L3 and the fourth lens L4 may be configured as single lenses in the imaging lens L, as illustrated in Examples 2 through 4. In this case, the occurrence of differences in spherical aberration depending on wavelength can be suppressed in the imaging lens.

The fifth lens L5 has a positive refractive power in the vicinity of the optical axis. Thereby, lateral chromatic aberration can be favorably corrected, while realizing a shortening of the total length. In addition, in the case that the fifth lens L5 has a convex surface toward the image side in the vicinity of the optical axis, it is preferable for a surface which has a radius of curvature with the smallest absolute value from among the lens surfaces of the first lens L1 through the sixth lens L6 to be the surface of the fifth lens L5 toward the image side. In this case, the generation of astigmatism can be suppressed while shortening the total length. In addition, it is preferable for the fifth lens L5 to be of a meniscus shape having a convex surface toward the image side in the vicinity of the optical axis, as illustrated in each of the Examples.

The sixth lens L6 has a negative refractive power in the vicinity of the optical axis. The total length can be favorably shortened, by providing a lens having a negative refractive power in the vicinity of the optical axis most toward the image side in the imaging lens. In addition, the negative refractive power of the sixth lens L6 can be sufficiently strong by providing the sixth lens L6 having a negative refractive power in the vicinity of the optical axis toward the image side of the fifth lens L5 having a positive refractive power in the vicinity of the optical axis. As a result, negative distortion, which is likely to be generated in the first lens L1, can be favorably corrected.

In addition, the sixth lens L6 has a concave surface toward the image side in the vicinity of the optical axis. Field curvature can be favorably corrected while shortening of the total length can be realized more favorably, by the sixth lens L6 having a concave surface toward the image side in the vicinity of the optical axis.

In addition, shortcomings, such as the incident angles of light rays at peripheral angles of view into the imaging surface increasing and light rays at peripheral angles of view not reaching the imaging surface due to being totally reflected, may arise in the case that the sixth lens L6 is a spherical lens having a concave surface toward the image side and the surface of the sixth lens L6 toward the image side has a radius of curvature with a small absolute value. However, the sixth lens L6 is configured to have a concave surface toward the image side in the vicinity of the optical axis and the surface toward the image side is of an aspherical shape having at least one inflection point within the effective diameter thereof, as illustrated in each of the Examples. Therefore, increases in the incident angles of light rays that pass through the optical system at peripheral angles of view into the imaging surface (imaging element) can be suppressed, particularly at the peripheral portions of an imaging region, and the occurrence of the aforementioned shortcoming caused by total reflection of light rays at peripheral angles of view can be suppressed. Note that the "inflection point" on the surface of the sixth lens L6 toward the image side refers to a point at which the shape of the surface of the sixth lens L6 toward the image side changes from a convex shape to a concave shape (or from a concave shape to a convex shape) with respect to the image side. The position of the inflection point may be any arbitrary position within a range from the optical axis to the effective diameter of the surface of the sixth lens L6 toward the object side.

In addition, the sixth lens L6 may be of a meniscus shape having a concave surface toward the image side in the vicinity of the optical axis, as illustrated in Examples 1 and 2. In this case, the necessity to set the negative refractive power of the sixth lens L6 to be excessively strong will become unlikely to occur, which is advantageous from the viewpoint of shortening the total length of the imaging lens. Alternatively, the sixth lens L6 may be of a biconcave shape in the vicinity of the optical axis, as illustrated in Examples 3 and 4. In this case, astigmatism can be favorably corrected.

According to the imaging lens L described above, the configurations of each of the first lens through the sixth lens are optimized as lens elements in a lens configuration having a total of six lenses. Therefore, a lens system having a wide angle of view and high resolution performance can be realized.

It is preferable for at least one of the surfaces of each of the first lens L1 through the sixth lens L6 of the imaging L to be an aspherical surface, in order to improve performance.

In addition, it is preferable for each of the lenses L1, L2, L5, and L6 that constitute the imaging lens L to be a single lens, not a cemented lens. If the lenses L1, L2, L5, and L6 are single lenses, the number of aspherical surfaces will be greater than that in the case that any of the lenses L1, L2, L5, and L6 is a cemented lens. Therefore, the degree of freedom in the design of each lens will increase, and the total length can be favorably shortened.

Next, the operation and effects of conditional formulae related to the imaging lens L will be described in greater detail. Note that it is preferable for the imaging lens L to satisfy any one of the following conditional formulae, or arbitrary combinations of the following conditional formulae. It is preferable for the conditional formulae to be satisfies to be selected as appropriate according to the items required of the imaging lens L.

First, it is preferable for the focal distance f of the entire system, the half angle of view ω, and the paraxial radius of curvature R6r of the surface of the sixth lens L6 toward the image side to satisfy Conditional Formula (1) below.

$$1 < f \cdot \tan \omega / R6r < 20 \quad (1)$$

Conditional Formula (1) defines a preferable range of numerical values for the ratio of a paraxial image height (f·tan ω) with respect to the paraxial radius of curvature R6r of the surface of the sixth lens L6 toward the image side. By setting the paraxial image height (f·tan ω) with respect to the paraxial radius of curvature R6r of the surface of the sixth lens L6 toward the image side such that the value of f·tan ω/R6r is not less than or equal to the lower limit defined in Conditional Formula (1), the absolute value of the paraxial radius of curvature R6r of the surface of the sixth lens L6 toward the image side, which is the surface most toward the image side in the imaging lens, with respect to the paraxial image height (f·tan ω), will not be excessively large. Thereby, field curvature can be sufficiently corrected while realizing a shortening of the total length. Note that field curvature can be favorably corrected from a central angle of view to peripheral angles of view in the case that in the case that the sixth lens L6 is of an aspherical shape having a concave surface toward the image side and at least one inflection point as illustrated in the imaging lenses of each of the Examples, and in the case that the lower limit of Conditional Formula (1) is satisfied. This configuration is favorable from the viewpoint of realizing a wide angle of view. In addition, by setting the paraxial image height (f·tan ω) with respect to the paraxial radius of curvature R6r of the surface of the sixth lens L6 toward the image side such that the value of f·tan ω/R6r is not greater than or equal to the upper limit defined in Conditional Formula (1), the absolute value of the paraxial radius of curvature R6r of the surface of the sixth lens L6 toward the image side, which is the surface most toward the image side in the imaging lens, with respect to the paraxial image height (f·tan ω), will not be excessively small. Thereby, increases in the incident angle of light rays that pass through the optical system and enter the imaging surface (imaging element) can be suppressed, particularly at peripheral angles of view, and field curvature being excessively corrected can be suppressed. It is preferable for Conditional Formula (1-1) to be satisfied, and more preferable for Conditional Formula (1-2) to be satisfied, in order to cause these advantageous effects to become more prominent.

$$1.5 < f \cdot \tan \omega / R6r < 10 \quad (1\text{-}1)$$

$$1.5 < f \cdot \tan \omega / R6r < 5 \quad (1\text{-}2)$$

In addition, it is preferable for the combined focal length f12 of the first lens L1 and the second lens L2 and the focal length f of the entire system to satisfy Conditional Formula (2) below.

$$-0.3 < f/f12 < 0 \quad (2)$$

Conditional Formula (2) defines a preferable range of numerical values for the ratio of the focal length f of the entire system with respect to the combined focal length f12 of the first lens L1 and the second lens L2. By maintaining the combined refractive power of the first lens L1 and the second lens L2 such that the value of f/f12 is not less than or equal to the lower limit defined in Conditional Formula (2), the combined refractive power of the first lens L1 and the second lens L2 will not be excessively strong with respect to the refractive power of the entire system, and distortion ca be favorably corrected. By securing the combined refractive power of the first lens L1 and the second lens L2 such that the value of f/f12 is not greater than or equal to the upper limit defined in Conditional Formula (2), the combined refractive power of the first lens L1 and the second lens L2 will not be excessively weak with respect to the refractive power of the entire system. As a result, increases in the angle between light rays that pass through the first lens L1 and the second lens L2 and the optical axis can be suppressed, which is advantageous from the viewpoint of realizing a wide angle of view. It is preferable for Conditional Formula (2-1) to be satisfied, and more preferable for Conditional Formula (2-2) to be satisfied, in order to cause these advantageous effects to become more prominent.

$$-0.25 < f/f12 < -0.05 \quad (2\text{-}1)$$

$$-0.2 < f/f12 < -0.1 \quad (2\text{-}2)$$

It is preferable for the focal length f of the entire system and the focal length f6 of the sixth lens L6 to satisfy Conditional Formula (3) below.

$$-5 < f/f6 < -0.7 \quad (3)$$

Conditional Formula (3) defines the preferred range of numerical values for the ratio of the focal length f of the entire system with respect to the focal length f6 of the sixth lens L6. By maintaining the refractive power of the sixth lens L6 such that the value of f/f6 is not less than or equal to the lower limit defined in Conditional Formula (3), the negative refractive power of the sixth lens L6 will not become excessively strong with respect to the refractive power of the entire system. As a result, increases in the incident angles of light rays that pass through the optical system and enter the imaging surface (imaging element) can be suppressed, particularly at the peripheral portions of an imaging region. By securing the refractive power of the sixth lens L6 such that the value of f/f6 is not greater than or equal to the upper limit defined in Conditional Formula (3), the negative refractive power of the sixth lens L6 will not become excessively weak with respect to the refractive power of the entire system. As a result, the total length can be shortened and field curvature can be favorably corrected. It is preferable for Conditional Formula (3-1) below to be satisfied, in order to cause these advantageous effects to become more prominent.

$$-4 < f/f6 < -0.9 \quad (3\text{-}1)$$

In addition, it is preferable for the distance Da between the second lens L2 and the third lens L3 along the optical axis and the focal length f of the entire system to satisfy Conditional Formula (4) below.

$$Da/f < 1 \quad (4)$$

Conditional Formula (4) defines a preferable range of numerical values for the ratio of the distance Da between the second lens L2 and the third lens L3 along the optical axis with respect to the focal length f of the entire system. By maintaining the distance Da between the second lens L2 and the third lens L3 along the optical axis with respect to the focal length f of the entire system such that the value of Da/f is not greater than or equal to the upper limit defined in Conditional Formula (4), an increase in the effective diameter of the first lens L1, which is likely to occur when shortening the total length and widening the angle of view, can be suppressed. It is preferable for Conditional Formula (4-1) below to be satisfied, in order to cause this advantageous effect to become more prominent. In addition, by securing the distance Da between the second lens L2 and the third lens L3 along the optical axis with respect to the focal length f of the entire system such that the value of Da/f is not less than or equal to the lower limit defined in Conditional Formula (4-1), a sufficient distance between the optical axis and incident positions of light rays at peripheral angles of view into the first lens L1, which has a negative refractive power, can be maintained. Therefore, the incident angles of the light rays at peripheral angles of view that enter the third lens L3 can be prevented from becoming excessively great.

$$0.1 < Da/f < 0.8 \quad (4\text{-}1)$$

In addition, it is preferable for the distance Db between the first lens L1 and the second lens L2 along the optical axis and the focal length f of the entire system to satisfy Conditional Formula (5) below.

$$0.3 < Db/f < 1 \quad (5)$$

Conditional Formula (5) defines a preferable range of numerical values for the ratio of the distance Db between the first lens L1 and the second lens L2 along the optical axis with respect to the focal length f of the entire system. By securing the distance Db between the first lens L1 and the second lens L2 along the optical axis with respect to the focal length f of the entire system such that the value of Db/f is not less than or equal to the lower limit defined in Conditional Formula (5), it will not become necessary for the negative refractive power of the first lens L1 to be excessively strong, which is advantageous from the viewpoint of realizing a wide angle of view. By maintaining the distance Db between the first lens L1 and the second lens L2 along the optical axis with respect to the focal length f of the entire system such that the value of Db/f is not greater than or equal to the upper limit defined in Conditional Formula (5), an increase in the effective diameter of the first lens L1, which is likely to occur when shortening the total length and widening the angle of view, can be suppressed. It is preferable for Conditional Formula (5-1) below to be satisfied, in order to cause this advantageous effect to become more prominent. Note that in each of the Examples, the distance Db between the first lens L1 and the second lens L2 along the optical axis corresponds to D2 shown in Tables 1, 3, 5 and 7 to be described later.

$$0.32 < Db/f < 0.7 \quad (5\text{-}1)$$

In addition, it is preferable for the distance Dc between the fifth lens L5 and the sixth lens L6 along the optical axis and the focal length f of the entire system to satisfy Conditional Formula (6) below.

$$Dc/f < 0.15 \quad (6)$$

Conditional Formula (6) defines a preferable range of numerical values for the ratio of the distance Dc between the fifth lens L5 and the sixth lens L6 along the optical axis with respect to the focal length f of the entire system. By maintaining the distance Dc between the fifth lens L5 and the sixth lens L6 along the optical axis with respect to the focal length f of the entire system such that the value of Dc/f is not greater than or equal to the upper limit defined in Conditional Formula (6), excessive correction of field curvature can be suppressed. It is preferable for Conditional Formula (6-1) below to be satisfied, in order to cause this advantageous effect to become more prominent. Note that in each of the Examples, the distance Dc between the fifth lens L5 and the sixth lens L6 along the optical axis corresponds to D10 shown in Table 1, or D11 shown in Tables 3, 5, and 7 to be described later.

$$Dc/f < 0.1 \quad (6\text{-}1)$$

In addition, it is preferable for the focal length f5 of the fifth lens L5 and the focal length f of the entire system to satisfy Conditional Formula (7) below.

$$1.2 < f/f5 < 5 \quad (7)$$

Conditional Formula (7) defines the preferred range of numerical values for the ratio of the focal length f of the entire system with respect to the focal length f5 of the fifth lens L5. By securing the refractive power of the fifth lens L5 such that the value of f/f5 is not less than or equal to the lower limit defined in Conditional Formula (7), the positive refractive power of the fifth lens L5 will not become excessively weak with respect to the refractive power of the entire system. As a result, the total length can be favorably shortened. By maintaining the refractive power of the fifth lens L5 such that the value of f/f5 is not greater than or equal to the upper limit defined in Conditional Formula (7), the positive refractive power of the fifth lens L5 will not become excessively strong with respect to the refractive power of the entire system. As a result, distortion can be favorably corrected. It is preferable for Conditional Formula (7-1) below to be satisfied, in order to cause these advantageous effects to become more prominent.

$$1.3 < f/f5 < 4 \quad (7\text{-}1)$$

In addition, it is preferable for the focal length f1 of the first lens L1 and the focal length f of the entire system to satisfy Conditional Formula (8) below.

$$-0.55 < f/f5 < -0.1 \quad (8)$$

Conditional Formula (8) defines the preferred range of numerical values for the ratio of the focal length f of the entire system with respect to the focal length f1 of the first lens L1. By maintaining the refractive power of the first lens L1 such that the value of f/f1 is not less than or equal to the lower limit defined in Conditional Formula (8), the negative refractive power of the first lens L1 will not become excessively strong with respect to the refractive power of the entire system. As a result, distortion can be favorably corrected. By securing the refractive power of the first lens L1 such that the value of f/f1 is not greater than or equal to the upper limit defined in Conditional Formula (8), the negative refractive power of the first lens L1 will not become excessively weak with respect to the refractive power of the entire system. As a result, suppression of increases in the angles between light rays at peripheral angles of view, which have passed through the first lens L1, and the optical axis can be facilitated, which is advantageous from the viewpoint of realizing a wide angle of view. It is preferable for Conditional Formula (8-1) below to be satisfied, in order to cause these advantageous effects to become more prominent.

$$-0.5 < f/f1 < -0.2 \quad (8\text{-}1)$$

As described above, in the imaging lens according to the embodiment of the present invention, the configuration of each lens element in a six lens configuration is optimized. Therefore, a wide angle of view can be realized, distortion can be favorably corrected, and high imaging performance can be realized from a central angle of view through peripheral angles of view.

If an imaging lens is configured such that the full angle of view thereof is 80 degrees or greater as in the imaging lenses of Examples 1 through 4, a further widening of the angle of view can be realized over the lens system disclosed in U.S. Pat. No. 8,335,043, which has a full angle of view of 78.4 degrees. In addition, if the lens configurations of the first lens L1 through the sixth lens L6 of an imaging lens are set such that the full angle of view thereof is 80 degrees or greater as in the imaging lenses of Examples 1 through 4, the imaging lens L can be favorably applied to cellular telephones and the like. As a result, it will become possible to meet the demand to obtain images, which are photographed at high resolution with a wide angle of view, and to obtain desired image portions within the photographed images by enlarging the desired image portions.

Further improved imaging performance can be realized by satisfying preferred conditions appropriately. In addition, the imaging apparatuses according to the embodiments of the present invention output image signals corresponding to optical images formed by the high performance imaging lenses according to the embodiments of the present invention. Therefore, images having high resolution from a central angle of view to peripheral angles of view can be obtained.

Next, specific examples of numerical values of the imaging lens of the present invention will be described. A plurality of examples of numerical values will be summarized and explained below.

Table 1 and Table 2 below show specific lens data corresponding to the configuration of the imaging lens illustrated in FIG. 1. Table 1 shows basic lens data of the imaging lens, and Table 2 shows data related to aspherical surfaces. In the lens data of Table 1, ith lens surface numbers that sequentially increase from the object side to the image side, with the lens surface at the most object side designated as first (the aperture stop St being number 1), are shown in the column Si for the imaging lens of Example 1. The radii of curvature (mm) of ith surfaces from the object side corresponding to the symbols Ri illustrated in FIG. 1 are shown in the column Ri. Similarly, the distances between an ith surface and an i+1st surface from the object side along the optical axis Z are shown in the column Di. The refractive indices of jth optical elements from the object side with respect to the d line (wavelength: 587.56 nm) are shown in the column Ndj. The Abbe's numbers of the jth optical elements with respect to the d line are shown in the column vdj. Note that the values of the focal length f (mm) of the entire system and back focus Bf (mm) are shown as data for each lens datum. Note that the back focus Bf is represented as air converted values.

In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 2 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E-02" indicates that the numerical value is "$1.0 \cdot 10^{-2}$".

The values of coefficients Ai and KA represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = C \cdot h^2 / \{1 + (1 - KA \cdot C^2 \cdot h^2)^{1/2}\} + \Sigma Ai \cdot h^i \quad (A)$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and KA is an aspherical surface coefficient.

Specific lens data corresponding to the configurations of the imaging lenses illustrated in FIG. 2 through FIG. 4 are shown in Table 3 through Table 8 as Example 2 through Example 4. In the imaging lenses of Examples 1 through 4, both of the surfaces of the first lens L1 through the sixth lens L6 are all aspherical surfaces.

Figure 6:
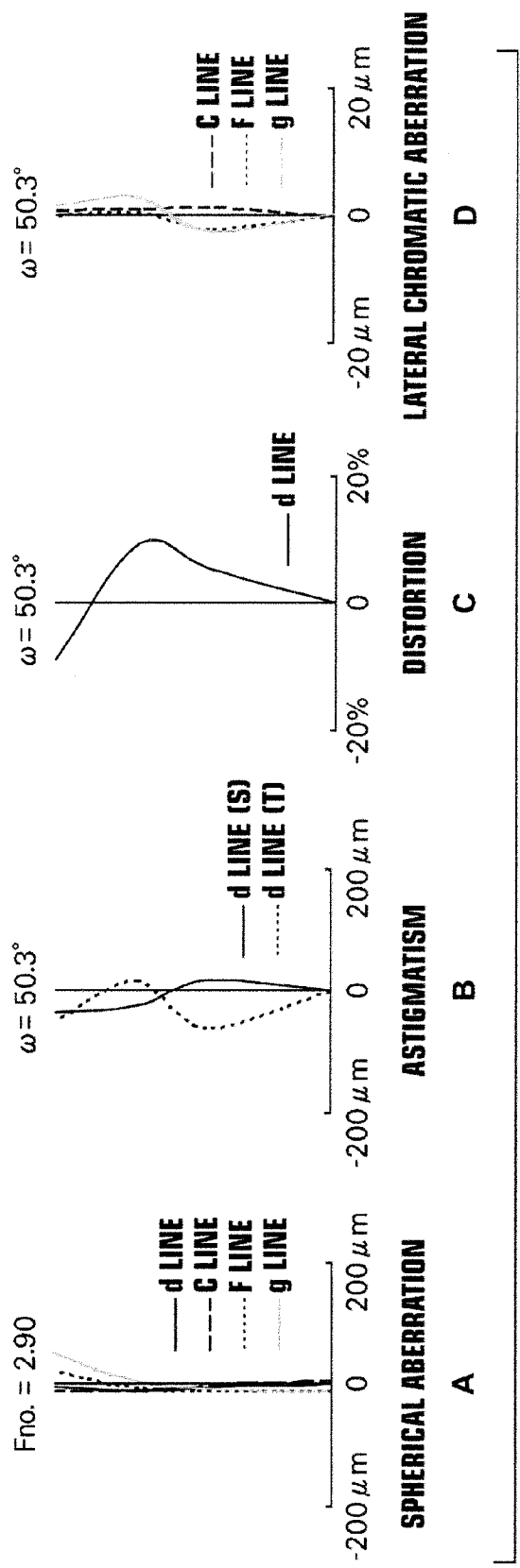
FIG. 6 is a collection of diagrams that illustrate aberrations of the imaging lens of Example 1, wherein A illustrates spherical aberration, B illustrates astigmatic aberration (field curvature), C illustrates distortion, and D illustrates lateral chromatic aberration.

A through D of FIG. 6 are diagrams that illustrate the spherical aberration, the astigmatic aberration, the distortion, and the lateral chromatic aberration of the imaging lens of Example 1, respectively. Each of the diagrams that illustrate the spherical aberration, the astigmatic aberration (field curvature), and the distortion illustrate aberrations using the d line (wavelength: 587.56 nm) as a standard wavelength. The diagrams that illustrate spherical aberration and lateral chromatic aberration, also show aberrations related to the F line (wavelengths: 486.1 nm) and the C line (wavelength: 656.27 nm). In addition, the diagram that illustrates spherical aberration also show aberrations related to the g line (wavelength: 435.83 nm). In the diagrams that illustrate astigmatic aberrations, aberrations in the sagittal direction (S) are indicated by solid lines, while aberrations in the tangential direction (T) are indicated by broken lines. In addition, "Fno." denotes F numbers, and "ω" denotes half angles of view.

Figure 7:
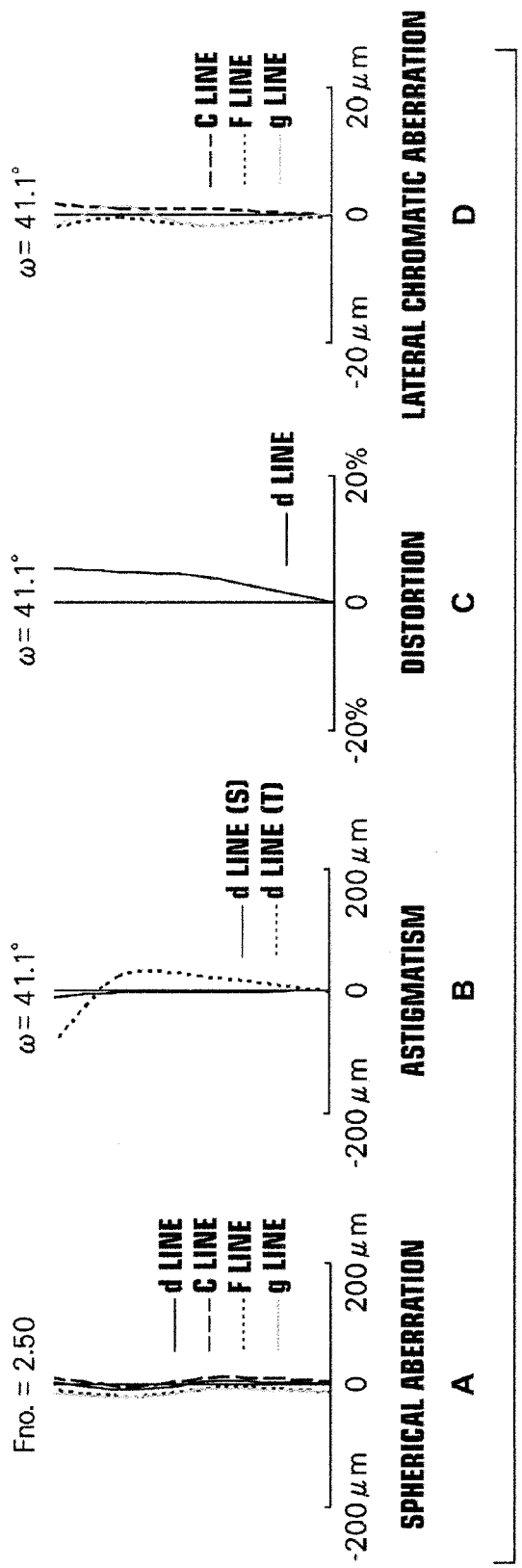
FIG. 7 is a collection of diagrams that illustrate aberrations of the imaging lens of Example 2, wherein A illustrates spherical aberration, B illustrates astigmatic aberration (field curvature), C illustrates distortion, and D illustrates lateral chromatic aberration.
Figure 8:
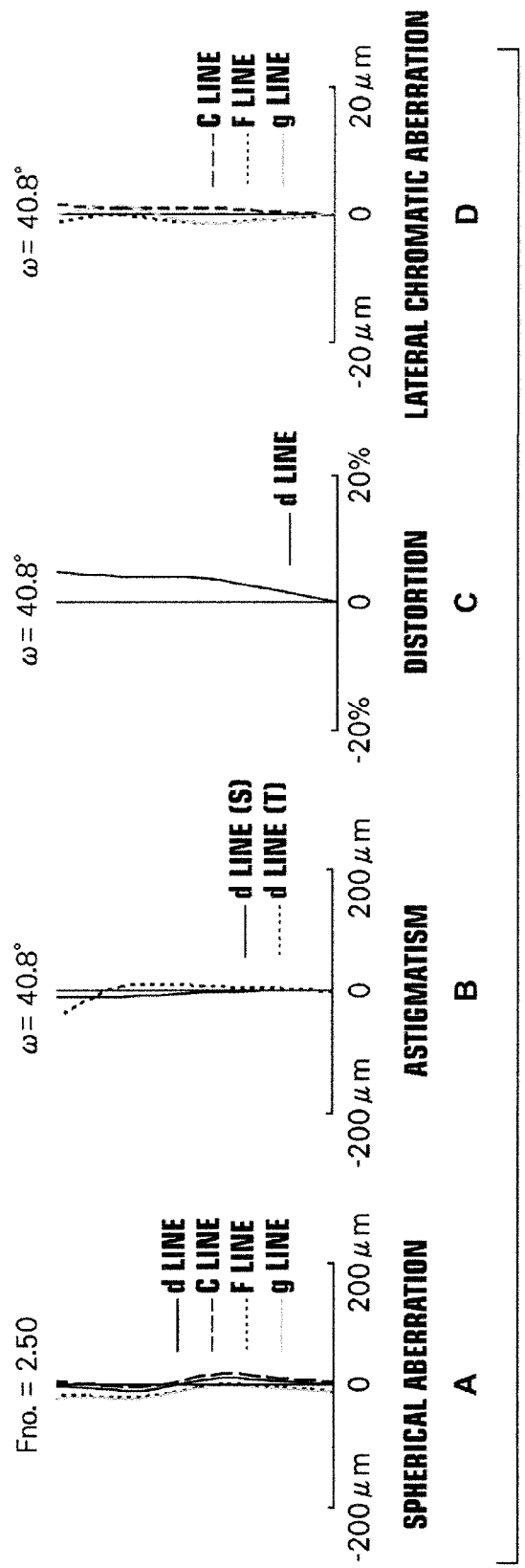
FIG. 8 is a collection of diagrams that illustrate aberrations of the imaging lens of Example 3, wherein A illustrates spherical aberration, B illustrates astigmatic aberration (field curvature), C illustrates distortion, and D illustrates lateral chromatic aberration.
Figure 9:
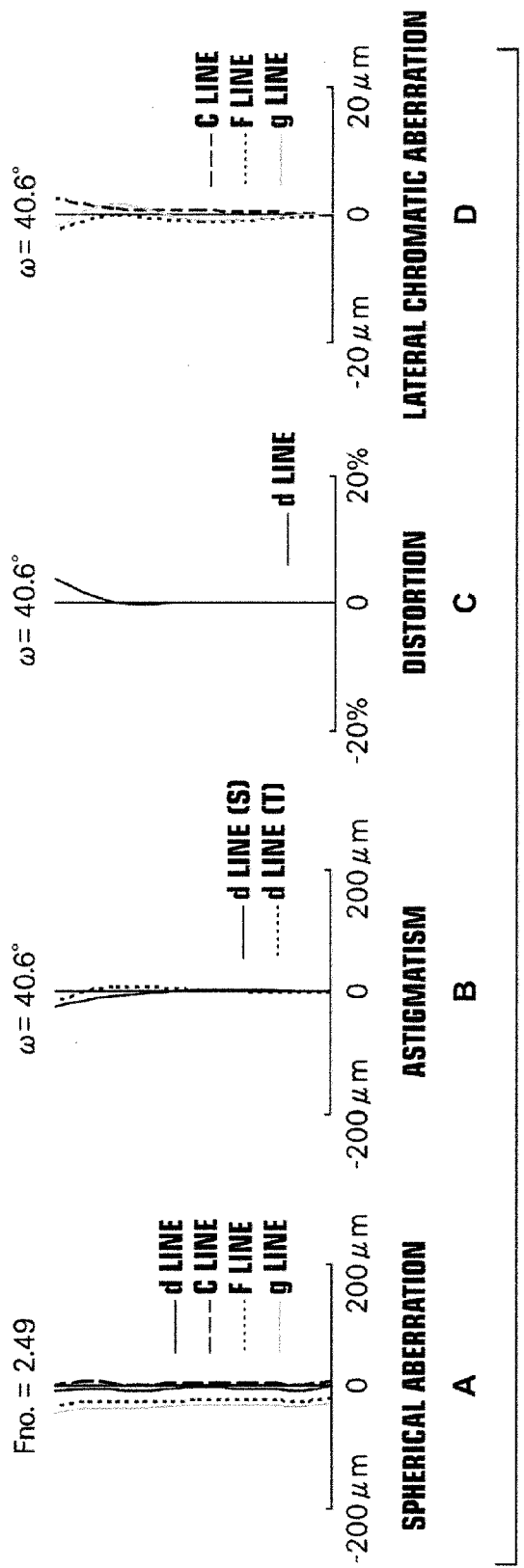
FIG. 9 is a collection of diagrams that illustrate aberrations of the imaging lens of Example 4, wherein A illustrates spherical aberration, B illustrates astigmatic aberration (field curvature), C illustrates distortion, and D illustrates lateral chromatic aberration.

Similarly, the aberrations of the imaging lens of Example 2 through Example 4 are illustrated in A through D of FIG. 7 through A through D of FIG. 9.

Table 9 shows values corresponding to Conditional Formulae (1) through (8) of Examples 1 through 4.

As can be understood from each set of numerical value data and from the diagrams that illustrate aberrations, each of the Examples favorably corrects distortion, and simultaneously realizes a wide angle of view and high imaging performance.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 2.366, Bf = 1.702

| Si | Ri | Di | Ndj | vdj |
|---|---|---|---|---|
| *1 | −9.96835 | 1.11310 | 1.54488 | 54.87 |
| *2 | 4.93530 | 1.14803 | | |
| *3 | 4.21048 | 0.48339 | 1.63361 | 23.62 |
| *4 | 8.70320 | 1.24852 | | |
| 5 (aperture stop) | ∞ | 0.08998 | | |
| *6 | 2.68917 | 1.04896 | 1.54488 | 54.87 |
| *7 | −2.57480 | 0.69823 | 1.63361 | 23.62 |
| *8 | 9.73384 | 0.24676 | | |
| *9 | −10.80706 | 1.24499 | 1.54488 | 54.87 |
| *10 | −0.82677 | 0.08162 | | |

TABLE 1-continued

Example 1
f = 2.366, Bf = 1.702

| Si | Ri | Di | Ndj | vdj |
|---|---|---|---|---|
| *11 | 16.29920 | 0.61268 | 1.54488 | 54.87 |
| *12 | 1.10779 | 0.63328 | | |
| 13 | ∞ | 0.10000 | 1.51633 | 64.14 |
| 14 | ∞ | 1.00249 | | |
| 15 (imaging surface) | ∞ | | | |

*aspherical surface

TABLE 2

Example 1: Aspherical Surface Data

| Surface Number | KA | A3 | A4 | A5 | A6 |
|---|---|---|---|---|---|
| 1 | 9.5237632E−01 | 0.0000000E+00 | 8.2752528E−02 | −1.4165662E−01 | 2.2792401E−01 |
| 2 | 5.2234040E−01 | 0.0000000E+00 | 4.2220834E−01 | −1.8644695E+00 | 4.7264696E+00 |
| 3 | −5.7877633E−01 | 0.0000000E+00 | 9.2853721E−02 | −1.3194690E−01 | 1.8234973E−01 |
| 4 | 1.8992353E−01 | 0.0000000E+00 | 4.9883672E−03 | 6.8187387E−01 | −2.3437860E+00 |
| 6 | 2.4702161E+00 | 0.0000000E+00 | 4.4361764E−02 | −5.5766640E−01 | 4.0101663E+00 |
| 7 | 4.5787853E+00 | 0.0000000E+00 | 3.2963959E−02 | −3.6415969E+00 | 1.7686017E+01 |
| 8 | −4.4453419E+00 | 0.0000000E+00 | −1.3949966E−01 | −2.5541088E+00 | −2.5541088E+00 |
| 9 | −1.5637205E+00 | 0.0000000E+00 | 1.4670176E−01 | −1.0710273E+00 | 3.5641656E+00 |
| 10 | −2.4132670E+00 | 0.0000000E+00 | 8.7519284E−01 | −5.5583907E+00 | 1.6262446E+01 |
| 11 | 6.7080286E+00 | 0.0000000E+00 | 1.0524623E+00 | −3.8016446E+00 | 6.9036509E+00 |
| 12 | −5.5809985E+00 | 0.0000000E+00 | 5.5620595E−01 | −2.1381342E+00 | 3.6913959E+00 |

| | A7 | A8 | A9 | A10 | A11 |
|---|---|---|---|---|---|
| 1 | −2.4616365E−01 | 1.6383185E−01 | −6.7382659E−02 | 1.6753366E−02 | −2.3071661E−03 |
| 2 | −7.0053349E+00 | 6.4076440E+00 | −3.6754739E+00 | 1.2841578E+00 | −2.4875136E−01 |
| 3 | −8.8247265E−01 | 1.6055495E+00 | −1.5207422E+00 | 7.7932074E−01 | −2.0576635E−01 |
| 4 | 4.1756861E+00 | −4.3139368E+00 | 2.5085299E+00 | −7.2538645E−01 | 5.0026583E−02 |
| 6 | −1.6301141E+01 | 3.9566525E+01 | −5.9103448E+01 | 5.3806264E+01 | −2.7845569E+01 |
| 7 | −5.1748631E+01 | 9.4115571E+01 | −1.0790091E+02 | 7.5866745E+01 | −2.9537577E+01 |
| 8 | 5.0165496E+00 | −5.8984464E+00 | 4.0103579E+00 | −1.2446341E+00 | −6.7148132E−02 |
| 9 | −7.0953814E+00 | 9.0447378E+00 | −7.6601746E+00 | 4.2111384E+00 | −1.3702565E+00 |
| 10 | −2.9258885E+01 | 3.4166451E+01 | −2.5948096E+01 | 1.2376179E+01 | −3.3701886E+00 |
| 11 | −7.9705517E+00 | 6.0087763E+00 | −2.9279729E+00 | 8.9073288E−01 | −1.5480164E−01 |
| 12 | −3.8760736E+00 | 2.6176370E+00 | −1.1371638E+00 | 3.0765608E−01 | −4.7495287E−02 |

| | A12 |
|---|---|
| 1 | 1.3480381E−04 |
| 2 | 2.0426862E−02 |
| 3 | 2.2927653E−02 |
| 4 | 1.5023625E−02 |
| 6 | 6.4715831E+00 |
| 7 | 4.9757179E+00 |
| 8 | 1.0346151E−01 |
| 9 | 1.9882717E−01 |
| 10 | 3.9941062E−01 |
| 11 | 1.1851894E−02 |
| 12 | 3.2255189E−03 |

TABLE 3

Example 2
f = 2.825, Bf = 1.513

| Si | Ri | Di | Ndj | vdj |
|---|---|---|---|---|
| *1 | −13.25406 | 1.03848 | 1.54488 | 54.87 |
| *2 | 5.48929 | 1.03794 | | |
| *3 | 5.13311 | 0.45893 | 1.63361 | 23.62 |
| *4 | 11.33605 | 1.19535 | | |
| 5 (aperture stop) | ∞ | 0.09177 | | |
| *6 | 2.43283 | 0.76310 | 1.54488 | 54.87 |
| *7 | −2.80994 | 0.27592 | | |
| *8 | −3.40196 | 0.48328 | 1.63361 | 23.62 |
| *9 | 4.59398 | 0.52373 | | |
| *10 | −13.68936 | 1.39700 | 1.54488 | 54.87 |
| *11 | −0.86292 | 0.08152 | | |
| *12 | 200.00000 | 0.60132 | 1.54488 | 54.87 |
| *13 | 1.18062 | 0.63328 | | |
| 14 | ∞ | 0.50000 | 1.51633 | 64.14 |
| 15 | ∞ | 0.54962 | | |
| 16 (imaging surface) | ∞ | | | |

*aspherical surface

TABLE 4

Example 2: Aspherical Surface Data

| Surface | KA | A3 | A4 | A5 | A6 |
|---|---|---|---|---|---|
| 1 | 5.7573548E−02 | 0.0000000E+00 | 8.1890968E−02 | −1.4195925E−01 | 2.2795032E−01 |
| 2 | 7.0299713E−01 | 0.0000000E+00 | 4.2277983E−01 | −1.8637528E+00 | 4.7267616E+00 |
| 3 | −9.7581428E−01 | 0.0000000E+00 | 9.2319513E−02 | −1.3299679E−02 | 1.8197990E−01 |
| 4 | −3.2886820E−01 | 0.0000000E+00 | 5.9132630E−03 | 6.8180854E−01 | −2.3439766E+00 |
| 6 | 2.8139460E+00 | 0.0000000E+00 | 5.4270985E−02 | −5.4770952E−01 | 4.0159752E+00 |
| 7 | −5.9875789E+00 | 0.0000000E+00 | 2.9466781E−01 | −4.4618408E+00 | 2.6538542E+01 |
| 8 | 5.8435369E+00 | 0.0000000E+00 | 1.8940624E−01 | −3.5691174E+00 | 1.7736169E+01 |
| 9 | −1.0955538E+00 | 0.0000000E+00 | −1.9126058E−01 | 7.4741895E−01 | −2.5525406E+00 |
| 10 | −1.4470297E+00 | 0.0000000E+00 | 1.4685638E−01 | −1.0691672E+00 | 3.5654333E+00 |
| 11 | −2.4304474E+00 | 0.0000000E+00 | 8.7752849E−01 | −5.5571326E+00 | 1.6263129E+01 |
| 12 | −6.9979736E+00 | 0.0000000E+00 | 1.0506603E+00 | −3.8021000E+00 | 6.9037127E+00 |
| 13 | −5.5805058E+00 | 0.0000000E+00 | 5.5671621E−01 | −2.1385359E+00 | 3.6908467E+00 |

| | A7 | A8 | A9 | A10 | A11 |
|---|---|---|---|---|---|
| 1 | −2.4608825E−01 | 1.6374093E−01 | −6.7292909E−02 | 1.6732229E−02 | −2.3093749E−03 |
| 2 | −7.0054456E+00 | 6.4074773E+00 | −3.6754846E+00 | 1.2842471E+00 | −2.4861237E−01 |
| 3 | −8.8337398E−01 | 1.6050015E+00 | −1.5212513E+00 | 7.7890197E−01 | −2.0596278E−01 |
| 4 | 4.1757189E+00 | −4.3141708E+00 | 2.5086141E+00 | −7.2549549E−01 | 4.9825167E−02 |
| 6 | −1.6322995E+01 | 3.9377569E+01 | −5.8762645E+01 | 5.3273144E+01 | −2.6865011E+01 |
| 7 | −9.0325018E+01 | 1.8887761E+02 | −2.4776805E+02 | 1.9881915E+02 | −8.9264849E+01 |
| 8 | −5.1746661E+01 | 9.4080079E+01 | −1.0797754E+02 | 7.5799118E+01 | −2.9568327E+01 |
| 9 | 5.0193433E+00 | −5.8967899E+00 | 4.0112340E+00 | −1.2490591E+00 | −6.7099609E−02 |
| 10 | −7.0944876E+00 | 9.0449528E+00 | −7.6607888E+00 | 4.2107467E+00 | −1.3702376E+00 |
| 11 | −2.9258886E+01 | 3.4166095E+01 | −2.5948390E+01 | 1.2375768E+01 | −3.3703335E+00 |
| 12 | −7.9701957E+00 | 6.0090848E+00 | −2.9278488E+00 | 8.9104892E−01 | −1.5473804E−01 |
| 13 | −3.8765813E+00 | 2.6172124E+00 | −1.1374236E+00 | 3.0774037E−01 | −4.7182205E−02 |

| | A12 |
|---|---|
| 1 | 1.3569096E−04 |
| 2 | 2.0337037E−02 |
| 3 | 2.2937483E−02 |
| 4 | 1.4692655E−02 |
| 6 | 5.7085864E+00 |
| 7 | 1.7167279E+01 |
| 8 | 4.9295607E+00 |
| 9 | 1.1065354E−01 |
| 10 | 1.9890314E−01 |
| 11 | 3.9997460E−01 |
| 12 | 1.1748982E−02 |
| 13 | 3.1270684E−03 |

TABLE 5

Example 3
f = 2.877, Bf = 1.531

| Si | Ri | Di | Ndj | vdj |
|---|---|---|---|---|
| *1 | −13.30588 | 1.03750 | 1.54488 | 54.87 |
| *2 | 5.49735 | 1.04346 | | |
| *3 | 5.11011 | 0.45002 | 1.63361 | 23.62 |
| *4 | 11.38629 | 1.19325 | | |
| 5 (aperture stop) | ∞ | 0.09999 | | |
| *6 | 2.43155 | 0.76030 | 1.54488 | 54.87 |
| *7 | −2.81509 | 0.27471 | | |
| *8 | −3.40779 | 0.48301 | 1.63361 | 23.62 |
| *9 | 4.58893 | 0.51766 | | |
| *10 | −14.14949 | 1.40470 | 1.54488 | 54.87 |
| *11 | −0.86268 | 0.08880 | | |
| *12 | −65.63665 | 0.59690 | 1.54488 | 54.87 |
| *13 | 1.18343 | 0.63328 | | |
| 14 | ∞ | 0.50000 | 1.51633 | 64.14 |
| 15 | ∞ | 0.56842 | | |
| 16 (imaging surface) | ∞ | | | |

*aspherical surface

TABLE 6

Example 3: Aspherical Surface Data

| Surface Number | KA | A3 | A4 | A5 | A6 |
|---|---|---|---|---|---|
| 1 | −1.6515960E−01 | 0.0000000E+00 | 8.1869015E−02 | −1.4194832E−01 | 2.2795539E−01 |
| 2 | 7.7399159E−01 | 0.0000000E+00 | 4.2284207E−01 | −1.8636833E+00 | 4.7267987E+00 |
| 3 | −9.7722268E−01 | 0.0000000E+00 | 9.2563714E−02 | −1.3408373E−02 | 1.8182140E−01 |

TABLE 6-continued

Example 3: Aspherical Surface Data

| | | | | | |
|---|---|---|---|---|---|
| 4  | −5.0357459E−01 | 0.0000000E+00 | 5.4852516E−03  | 6.8174788E−01  | −2.3438815E+00 |
| 6  |  2.8139498E+00 | 0.0000000E+00 | 5.3266064E−02  | −5.4734420E−01 |  4.0169225E+00 |
| 7  | −5.9806389E+00 | 0.0000000E+00 | 2.9458760E−01  | −4.4618258E+00 |  2.6539962E+01 |
| 8  |  5.9382314E+00 | 0.0000000E+00 | 1.8976407E−01  | −3.5684033E+00 |  1.7736198E+01 |
| 9  | −1.0955538E+00 | 0.0000000E+00 | −1.9053123E−01 |  7.4769912E−01 | −2.5524348E+00 |
| 10 | −1.1571197E+00 | 0.0000000E+00 | 1.5039570E−01  | −1.0685346E+00 |  3.5650966E+00 |
| 11 | −2.4304474E+00 | 0.0000000E+00 | 8.7864029E−01  | −5.5562991E+00 |  1.6263366E+01 |
| 12 | −7.0726114E+00 | 0.0000000E+00 | 1.0507833E+00  | −3.8021179E+00 |  6.9037833E+00 |
| 13 | −5.5805058E+00 | 0.0000000E+00 | 5.5650876E−01  | −2.1385682E+00 |  3.6908592E+00 |

| | A7 | A8 | A9 | A10 | A11 |
|---|---|---|---|---|---|
| 1  | −2.4608709E−01 |  1.6374131E−01 | −6.7292794E−02 |  1.6732248E−02 | −2.3093768E−03 |
| 2  | −7.0054330E+00 |  6.4074861E+00 | −3.6754795E+00 |  1.2842501E+00 | −2.4861025E−01 |
| 3  | −8.8347920E−01 |  1.6049699E+00 | −1.5212870E+00 |  7.7889875E−01 | −2.0596374E−01 |
| 4  |  4.1757617E+00 | −4.3141847E+00 |  2.5085783E+00 | −7.2552914E−01 |  4.9803772E−02 |
| 6  | −1.6902204E+01 |  4.3236231E+01 | −6.8951433E+01 |  6.6647320E+01 | −3.5586778E+01 |
| 7  | −9.0323065E+01 |  1.8887923E+02 | −2.4776719E+02 |  1.9881930E+02 | −8.9265223E+01 |
| 8  | −5.1746828E+01 |  9.4080055E+01 | −1.0797748E+02 |  7.5799107E+01 | −2.9568479E+01 |
| 9  |  5.0190323E+00 | −5.8972497E+00 |  4.0108561E+00 | −1.2492521E+00 | −6.7123134E−02 |
| 10 | −7.0946948E+00 |  9.0450186E+00 | −7.6606438E+00 |  4.2108612E+00 | −1.3701852E+00 |
| 11 | −2.9258887E+01 |  3.4166043E+01 | −2.5948413E+01 |  1.2375761E+01 | −3.3703299E+00 |
| 12 | −7.9702054E+00 |  6.0090808E+00 | −2.9278505E+00 |  8.9104876E−01 | −1.5473780E−01 |
| 13 | −3.8765732E+00 |  2.6172151E+00 | −1.1374227E+00 |  3.0774049E−01 | −4.7182338E−02 |

| | A12 |
|---|---|
| 1  | 1.3568121E−04 |
| 2  | 2.0338247E−02 |
| 3  | 2.2941069E−02 |
| 4  | 1.4681770E−02 |
| 6  | 7.9720118E+00 |
| 7  | 1.7166674E+01 |
| 8  | 4.9288468E+00 |
| 9  | 1.1082911E−01 |
| 10 | 1.9890102E−01 |
| 11 | 3.9998737E−01 |
| 12 | 1.1749302E−02 |
| 13 | 3.1269237E−03 |

TABLE 7

Example 4
f = 2.921, Bf = 1.218

| Si | Ri | Di | Ndj | vdj |
|---|---|---|---|---|
| *1  | −12.35454 | 0.96131 | 1.54488 | 54.87 |
| *2  |   5.50255 | 1.09209 |         |       |
| *3  |   4.69542 | 0.51366 | 1.63361 | 23.62 |
| *4  |  11.88936 | 1.13439 |         |       |
| 5 (aperture stop) | ∞ | 0.10000 | | |
| *6  |   2.54917 | 0.98723 | 1.54488 | 54.87 |
| *7  |  −2.56138 | 0.25093 |         |       |
| *8  |  −3.93083 | 0.48257 | 1.63361 | 23.62 |
| *9  |   4.52160 | 0.45662 |         |       |
| *10 |  −7.77892 | 1.55180 | 1.54488 | 54.87 |
| *11 |  −0.75734 | 0.10181 |         |       |
| *12 | −10.51498 | 0.62726 | 1.54488 | 54.87 |
| *13 |   0.91034 | 0.63328 |         |       |
| 14  | ∞ | 0.50000 | 1.51633 | 64.14 |
| 15  | ∞ | 0.25474 |         |       |
| 16 (imaging surface) | ∞ | | | |

*aspherical surface

TABLE 8

Example 4: Aspherical Surface Data

| Surface Number | KA | A3 | A4 | A5 | A6 |
|---|---|---|---|---|---|
| 1 |  8.5409420E−01 |  8.0207508E−04 |  5.6026373E−02 | −7.2084578E−02 |  1.2077554E−01 |
| 2 |  9.1282449E−01 |  3.4146976E−02 |  1.8030773E−02 | −1.3791462E−01 |  6.1758461E−01 |
| 3 | −9.9994464E−01 | −1.1134476E−02 |  1.7530644E−01 | −4.6716838E−01 |  1.5123395E+00 |
| 4 | −6.5870058E−01 | −1.7290724E−02 |  2.2157898E−01 | −5.8565737E−01 |  1.7320860E+00 |
| 6 |  2.7437121E+00 | −2.7179291E−03 |  1.1043048E−01 | −1.0324743E+00 |  6.3180784E+00 |
| 7 | −5.4907334E+00 | −8.7839452E−03 |  3.8551491E−01 | −5.1574700E+00 |  2.9463587E+01 |
| 8 |  5.8979520E+00 |  1.4021379E−02 | −1.6377736E−01 | −8.0226712E−01 |  5.6852088E+00 |
| 9 | −1.0549799E+00 | −1.3881423E−02 | −3.2567858E−02 | −3.8739349E−01 |  1.8511880E+00 |

TABLE 8-continued

Example 4: Aspherical Surface Data

| | | | | | |
|---|---|---|---|---|---|
| 10 | 1.7478891E+00 | 1.2536356E-02 | -3.2144087E-03 | -1.3316388E-01 | 3.4238614E-01 |
| 11 | -2.4196285E+00 | 4.8875672E-02 | 1.9716303E-01 | -2.1991887E+00 | 7.1323843E+00 |
| 12 | 4.8525922E+00 | 1.4709891E-01 | -1.0135223E-01 | 2.6740513E-01 | -1.0442615E+00 |
| 13 | -5.6243804E+00 | 9.8260267E-02 | -1.8215512E-01 | 1.8223576E-01 | -3.4619561E-01 |

| | A7 | A8 | A9 | A10 | A11 |
|---|---|---|---|---|---|
| 1 | -1.4497679E-01 | 1.0277291E-01 | -4.3713502E-02 | 1.1059782E-02 | -1.5337514E-03 |
| 2 | -9.9541642E-01 | 7.7057260E-01 | -2.6856525E-01 | -8.3787747E-04 | 2.6770876E-02 |
| 3 | -3.2740003E+00 | 4.3636825E+00 | -3.5722991E+00 | 1.7305225E+00 | -4.5696147E-01 |
| 4 | -3.8722533E+00 | 5.8900530E+00 | -5.8281174E+00 | 3.5228700E+00 | -1.1818384E+00 |
| 6 | -2.3544513E+01 | 5.5316108E+01 | -8.2821727E+01 | 7.6588298E+01 | -3.9846726E+01 |
| 7 | -9.7848913E+01 | 2.0135991E+02 | -2.6112721E+02 | 2.0776243E+02 | -9.2662734E+01 |
| 8 | -1.9390695E+01 | 3.8201692E+01 | -4.5661784E+01 | 3.2359974E+01 | -1.2346533E+01 |
| 9 | -5.5290465E+00 | 1.0291932E+01 | -1.2000835E+01 | 8.6303330E+00 | -3.5306416E+00 |
| 10 | -3.0440304E-01 | -1.5150609E-01 | 3.6371443E-01 | -1.8061772E-01 | 2.0716889E-02 |
| 11 | -1.3981884E+01 | 1.7775835E+01 | -1.4621744E+01 | 7.4916968E+00 | -2.1737092E+00 |
| 12 | 1.5931959E+00 | -1.3820134E+00 | 7.5653008E-01 | -2.5597362E-01 | 4.8420159E-02 |
| 13 | 4.4809250E-01 | -3.5540698E-01 | 1.7945885E-01 | -5.6684048E-02 | 1.0248363E-02 |

| | A12 |
|---|---|
| 1 | 8.9553153E-05 |
| 2 | -5.2535697E-03 |
| 3 | 5.1538550E-02 |
| 4 | 1.7009325E-01 |
| 6 | 8.8962665E+00 |
| 7 | 1.7742904E+01 |
| 8 | 1.9519746E+00 |
| 9 | 6.3467454E-01 |
| 10 | 3.2257002E-04 |
| 11 | 2.7311118E-01 |
| 12 | -3.8973488E-03 |
| 13 | -8.1024818E-04 |

TABLE 9

Values Related to Conditional Formulae

| Formula | Condition | Example 1 | Example 2 | Example 3 | Example 4 |
|---|---|---|---|---|---|
| 1 | f·tanω/R6r | 2.572 | 2.088 | 2.098 | 2.750 |
| 2 | f/f12 | -0.173 | -0.180 | -0.179 | -0.142 |
| 3 | f/f6 | -1.069 | -1.295 | -1.353 | -1.936 |
| 4 | Da/f | 0.566 | 0.456 | 0.450 | 0.423 |
| 5 | Db/f | 0.485 | 0.367 | 0.363 | 0.374 |
| 6 | Dc/f | 0.034 | 0.029 | 0.031 | 0.035 |
| 7 | f/f5 | 1.503 | 1.736 | 1.770 | 2.045 |
| 8 | f/f1 | -0.401 | -0.404 | -0.411 | -0.426 |

What is claimed is:

1. An imaging lens consisting of six lenses, including:
a first lens having a negative refractive power;
a second lens having a positive refractive power;
a third lens having a positive refractive power;
a fourth lens having a negative refractive power;
a fifth lens having a positive refractive power; and
a sixth lens having a negative refractive power, a concave surface toward an image side, and at least one inflection point on the surface toward the image side; provided in this order from an object side;
the imaging lens satisfying the following conditional formula:

$$1 < f \cdot \tan \omega / R6r < 20 \quad (1)$$

wherein f is the focal length of the entire system, ω is the half angle of view, and R6r is the paraxial radius of curvature of the surface of the sixth lens toward the image side, and further satisfies the following conditional formula:

$$0.3 < Db/f < 1 \quad (5)$$

wherein f is the focal length of the entire system, and Db is the distance between the first lens and the second lens along an optical axis.

2. The imaging lens as defined in claim 1 that further satisfies the following conditional formula:

$$-5 < f/f6 < -0.7 \quad (3)$$

wherein f is the focal length of the entire system, and f6 is the focal length of the sixth lens.

3. The imaging lens as defined in claim 1 that further satisfies the following conditional formula:

$$Da/f < 1 \quad (4)$$

wherein f is the focal length of the entire system, and Da is the distance between the second lens and the third lens along an optical axis.

4. The imaging lens as defined in claim 1 that further satisfies the following conditional formula:

$$Dc/f < 0.15 \quad (6)$$

wherein f is the focal length of the entire system, and Dc is the distance between the fifth lens and the sixth lens along an optical axis.

5. The imaging lens as defined claim 1 that further satisfies the following conditional formula:

$$1.2 < f/f5 < 5 \quad (7)$$

wherein f is the focal length of the entire system, and f5 is the focal length of the fifth lens.

6. The imaging lens as defined in claim 1 that further satisfies the following conditional formula:

$$-0.55 < f/f1 < -0.1 \tag{8}$$

wherein f is the focal length of the entire system, and f1 is the focal length of the first lens.

7. The imaging lens as defined in claim 1, wherein:
a surface which has a radius of curvature with the smallest absolute value from among the lens surfaces of the first lens through the sixth lens is the surface of the fifth lens toward the image side, in the case that the surface of the fifth lens toward the image side is a convex surface.

8. The imaging lens as defined in claim 1 that further satisfies the following conditional formula:

$$1.5 < f \cdot \tan \omega / R6r < 10 \tag{1-1}$$

wherein f is the focal length of the entire system, ω is the half angle of view, and R6r is the paraxial radius of curvature of the surface of the sixth lens toward the image side.

9. The imaging lens as defined in claim 8 that further satisfies the following conditional formula:

$$1.5 < f \cdot \tan \omega / R6r < 5 \tag{1-2}.$$

10. The imaging lens as defined in claim 1 that further satisfies the following conditional formula:

$$-0.25 < f/f12 < -0.05 \tag{2-1}$$

wherein f is the focal length of the entire system, and f12 is the combined focal length of the first lens and the second lens.

11. The imaging lens as defined in claim 1 that further satisfies the following conditional formula:

$$-4 < f/f6 < -0.9 \tag{3-1}$$

wherein f is the focal length of the entire system, and f6 is the focal length of the sixth lens.

12. The imaging lens as defined in claim 1 that further satisfies the following conditional formula:

$$Dc/f < 0.1 \tag{6-1}$$

wherein f is the focal length of the entire system, and Dc is the distance between the fifth lens and the sixth lens along an optical axis.

13. The imaging lens as defined in claim 1, further comprising:
an aperture stop provided between the second lens and the third lens.

14. An imaging apparatus equipped with an imaging lens as defined in claim 1.

15. An imaging lens consisting of six lenses, including:
a first lens having a negative refractive power;
a second lens having a positive refractive power;
a third lens having a positive refractive power;
a fourth lens having a negative refractive power;
a fifth lens having a positive refractive power; and
a sixth lens having a negative refractive power, a concave surface toward an image side, and at least one inflection point on the surface toward the image side; provided in this order from an object side;
the imaging lens satisfying the following conditional formula:

$$-0.3 < f/f12 < 0 \tag{2}$$

wherein f is the focal length of the entire system, and f12 is the combined focal length of the first lens and the second lens.

16. The imaging lens as defined in claim 15 that further satisfies the following conditional formula:

$$1 < f \cdot \tan \omega / R6r < 20 \tag{1}$$

wherein f is the focal length of the entire system, ω is the half angle of view, and R6r is the paraxial radius of curvature of the surface of the sixth lens toward the image side.

17. An imaging lens consisting of six lenses, including:
a first lens having a negative refractive power and a concave surface toward an object side;
a second lens having a positive refractive power;
a third lens having a positive refractive power;
a fourth lens having a negative refractive power;
a fifth lens having a positive refractive power; and
a sixth lens having a negative refractive power, a concave surface toward an image side, and at least one inflection point on the surface toward the image side; provided in this order from the object side.

18. The imaging lens as defined in claim 17 that further satisfies the following conditional formula:

$$1 < f \cdot \tan \omega / R6r < 20 \tag{1}$$

wherein f is the focal length of the entire system, ω is the half angle of view, and R6r is the paraxial radius of curvature of the surface of the sixth lens toward the image side.

19. The imaging lens as defined in claim 17 that further satisfies the following conditional formula:

$$-0.3 < f/f12 < 0 \tag{2}$$

wherein f is the focal length of the entire system, and f12 is the combined focal length of the first lens and the second lens.

* * * * *